United States Patent
Qi et al.

(10) Patent No.: US 11,614,998 B2
(45) Date of Patent: Mar. 28, 2023

(54) MULTI-SCREEN DISPLAY CONTROL DEVICE

(71) Applicant: Silicon Motion, Inc., Jhubei (TW)

(72) Inventors: Chengliang Qi, Shanghai (CN); Guangjun Lyu, Shandong Province (CN); Cong Li, Xinyang (CN)

(73) Assignee: SILICON MOTION, INC., Jhubei (TW)

( * ) Notice: Subject to any disclaimer, the term of this patent is extended or adjusted under 35 U.S.C. 154(b) by 119 days.

(21) Appl. No.: 17/249,943

(22) Filed: Mar. 19, 2021

(65) Prior Publication Data

US 2022/0188193 A1    Jun. 16, 2022

(30) Foreign Application Priority Data

Dec. 11, 2020   (CN) .......................... 202011462657.1

(51) Int. Cl.
*G06F 3/14* (2006.01)
*G06F 11/14* (2006.01)
*G09G 5/36* (2006.01)
*G06F 13/42* (2006.01)

(52) U.S. Cl.
CPC ........ *G06F 11/1441* (2013.01); *G06F 3/1438* (2013.01); *G06F 3/1446* (2013.01); *G06F 13/4282* (2013.01); *G09G 5/363* (2013.01); *G09G 2300/026* (2013.01); *G09G 2310/08* (2013.01); *G09G 2370/10* (2013.01); *G09G 2370/12* (2013.01)

(58) Field of Classification Search
CPC ............... G06F 11/1441; G06F 3/1438; G06F 13/4282; G06F 3/1446; G09G 5/363; G09G 2300/026; G09G 2310/08; G09G 2370/10; G09G 2370/12; G09G 2360/04–06

See application file for complete search history.

(56) References Cited

U.S. PATENT DOCUMENTS

| 5,978,389 A | 11/1999 | Chen |
| 6,384,868 B1 | 5/2002 | Oguma |
| 7,483,031 B2 | 1/2009 | Williams et al. |
| 7,502,546 B2 | 3/2009 | Elberbaum |

(Continued)

FOREIGN PATENT DOCUMENTS

| CN | 108965643 A | 12/2018 |
| CN | 111629246 A | 9/2020 |
| TW | 201820137 A | 6/2018 |

OTHER PUBLICATIONS

Notice of Allowance dated Aug. 4, 2021, issued in U.S. Appl. No. 17/249,944.

(Continued)

*Primary Examiner* — Sanghyuk Park
(74) *Attorney, Agent, or Firm* — McClure, Qualey & Rodack, LLP

(57) ABSTRACT

A multi-screen display control device includes a plurality of graphics processing units (GPUs) and a watchdog chip. The GPUs transform image data that a host transfers to the multi-screen display control device through a universal serial bus (USB) interface into a plurality of high-definition multi-media interface (HDMI) sub-images to be displayed by a plurality of screens. The watchdog chip is coupled to the GPUs and, when any of the GPUs crashes, the watchdog chip outputs a reset signal to reset all of the GPUs.

24 Claims, 9 Drawing Sheets

(56) References Cited

U.S. PATENT DOCUMENTS

| | | | |
|---|---|---|---|
| 9,360,883 B1 | 6/2016 | Barman et al. | |
| 2001/0002124 A1* | 5/2001 | Mamiya | G09G 5/005 |
| | | | 345/418 |
| 2007/0291039 A1 | 12/2007 | Danilak | |
| 2008/0057894 A1 | 3/2008 | Aleksic et al. | |
| 2008/0136825 A1 | 6/2008 | Bakalash et al. | |
| 2009/0182917 A1 | 7/2009 | Kim | |
| 2009/0300243 A1 | 12/2009 | Chao | |
| 2010/0177016 A1 | 7/2010 | Zeng | |
| 2010/0180055 A1 | 7/2010 | Lyon et al. | |
| 2013/0258194 A1 | 10/2013 | Fukui | |
| 2014/0085174 A1* | 3/2014 | Inoue | G09G 3/2074 |
| | | | 345/87 |
| 2014/0362031 A1 | 12/2014 | Mo et al. | |
| 2015/0271434 A1 | 9/2015 | Ezequiel et al. | |
| 2018/0060014 A1 | 3/2018 | Son et al. | |
| 2018/0063477 A1 | 3/2018 | Yu | |
| 2018/0068638 A1 | 3/2018 | Ellis et al. | |
| 2018/0158430 A1* | 6/2018 | Shiomi | G02F 1/13452 |
| 2019/0046876 A1 | 2/2019 | Dietrich et al. | |
| 2019/0373211 A1 | 12/2019 | Chen | |
| 2020/0275149 A1 | 8/2020 | Su et al. | |
| 2021/0294558 A1 | 9/2021 | Griffin | |

OTHER PUBLICATIONS

Non-Final Office Action dated Nov. 28, 2022, issued in U.S. Appl. No. 17/249,945 (copy not provided).

\* cited by examiner

MULTI-SCREEN DISPLAY CONTROL DEVICE

CROSS REFERENCE TO RELATED APPLICATIONS

This application claims priority of China Patent Application No. 202011462657.1, filed on Dec. 11, 2020, the entirety of which is incorporated by reference herein.

BACKGROUND OF THE INVENTION

Field of the Invention

The present invention relates to a large-screen video wall made up of a plurality of small screens.

Description of the Related Art

There are various applications for multi-screen displays, such as an ultra-large-scale liquid-crystal display (LCD) in a shopping mall or a large-scale surveillance display. Due to bottlenecks in the production of LCD panels, large screens are usually made up of several small screens; therefore, this technology is called multi-screen display.

FIG. 1 is a block diagram depicting a conventional multi-screen display system 100, which uses 2×2 screens 102_1, 102_2, 102_3, and 102_4 assembled together to form a large screen. A host 104 communicates with a splitter 106 through a high-definition multimedia interface (HDMI). A 4K HDMI image HDMI_0 provided by the host 104 is transferred to the splitter 106 for replication. The splitter 106 outputs four identical 4K HDMI images HDMI_1, HDMI_2, HDMI_3, and HDMI_4, to four scalers 108_1, 108_2, 108_3, and 108_4, respectively. Each scaler amplifies the received 4K HDMI image by four times, and outputs a quarter (HDMI 1080p) of the amplified image to a connected screen for image display. Four image quarters (four HDMI 1080p images) are displayed on the screens 102_1, 102_2, 102_3, and 102_4 to form a large screen picture.

The HDMI image replication technology of the splitter 106 of the conventional multi-screen display system 100 is costly. In particular, there is an asynchronous problem between scalers 108_1 . . . 108_4, which may result in ±1 frame (16 ms) asynchronous error. Faced with the demand for the larger screen display, more small screens are used in a multi-screen display system. It means heavier workload on HDMI image replication and more scalers are required to build one large image; along with it, the large-screen display is more expensive and the asynchronous error is severer. In addition, boundary trimming is necessary because of the border thickness of a video wall. The border thickness is uncertain. Because the scalers involve image replication, the boundary trimming has to be performed after the scalers finish the image replication. There are technical difficulties in boundary trimming.

There is another drawback of the conventional technique. Conventionally, the small images are combined to form a large-screen image by hardware devices; it is inflexible. For example, it is not easy to change a 4×4 architecture that form a 16-screen display to other architectures (e.g., 2×8 or 8×2).

BRIEF SUMMARY OF THE INVENTION

The present invention proposes a low-cost multi-screen display solution, and in particular, it proposes a solution to graphics processing units that crash easily.

A multi-screen display control device in accordance with an exemplary embodiment of the present invention has a plurality of graphics processing units (GPUs) and a watchdog chip. The GPUs transform image data that a host transfers to the multi-screen display control device through a universal serial bus (USB) interface into a plurality of high-definition multi-media interface (HDMI) sub-images to be displayed on a plurality of screens. The watchdog chip is coupled to the GPUs and, when any of the GPUs crashes, the watchdog chip outputs a reset signal to reset all of the GPUs.

In an exemplary embodiment, each GPU has a general-purpose input and output (GPIO) pin coupled to the watchdog chip to operate the watchdog chip to output the reset signal via an output terminal of the watchdog chip. The output terminal of the watchdog chip may be coupled to a reset pin of each GPU.

In an exemplary embodiment, when failing to receive a heartbeat packet from the host within a specified time limit, a GPU uses the GPIO pin to operate the watchdog chip to output the reset signal. When a GPU fails in decoding or fails to access a storage device of the GPU, the GPU fails to receive the heartbeat packet from the host within the specified time limit. The watchdog chip is triggered by a low-voltage signal to output the reset signal. When a GPIO pin of a firmware failed GPU is low, the firmware failed GPU triggers the watchdog chip to output the reset signal. Each GPU may include a tightly-coupled memory, which stores an interrupt vector table for firmware operations. A firmware failed GPU accesses the tightly-coupled memory to pull down a voltage level at the GPIO pin to trigger the watchdog chip to output the reset signal.

In an exemplary embodiment, the watchdog chip further outputs the reset signal based on clock switching of the GPUs. The watchdog chip may be triggered by a low-voltage signal at an input terminal of the watchdog chip. the GPIO pin of each GPU is coupled the input terminal of the watchdog chip. In an exemplary embodiment, a logic gate is coupled to the watchdog chip. In response to clock switching of the GPUs, the logic gate provides the low-voltage signal at the input terminal of the watchdog chip.

The aforementioned technology can be implemented on a single card. In another exemplary embodiment, several cards are connected in series to control more screens. Each watchdog chip outputs the reset signal in response to a reset request received from a former-stage card. In each card, there may be a logic gate coupled to the watchdog chip to generate the low-voltage signal for the watchdog chip in response to clock switching of the GPUs in the card or in response to the reset request received from the former-stage card. An output terminal of the logic gate is further coupled to a next-stage card to reset GPUs of a next-stage card A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Instead of using splitters and scalers for multi-screen display, an exemplary embodiment of the present invention receives high definition (HD) image data from a host through universal serial bus (USB) interface. The received HD image data is transformed into small screen images (sub-images) by a plurality of graphics processing units (GPUs). The sub-images form a large screen image to be displayed on a multi-screen display (video wall). Compared with the conventional multi-screen display system 100, the present invention has the following advantages:

Different from the scalers, GPUs can achieve any combination of small screens, such as a screen array of 1×9, 2×4, 1×16, 2×8, 16×1 . . . etc.

Different from the splitter, GPUs have the capability to rotate an image at any angle to achieve the effect of an artistic wall, and are powerful enough to achieve high-resolution (e.g., 4K, 8K . . . ) image stitching.

GPUs can easily trim the boundaries and optimize the edges of the adjacent sib-images.

Without the image amplification distortion caused by the scalers, the present invention displays a HD large-screen image.

Due to the high bandwidth of USB (for example, the 5G bps bandwidth of USB 3.0), the HD image data transferred through the USB interface can be in a compressed format. Through the USB interface, it is easy to transfer compressed HD image data for the large-screen display of more than 16 HDMI screens. The USB interface is a low cost solution for large-screen display. Furthermore, a synchronization design and a reset scheme for the GPUs are shown. The sub-images displayed on small screens correctly form a large-screen image.

Figure 1:
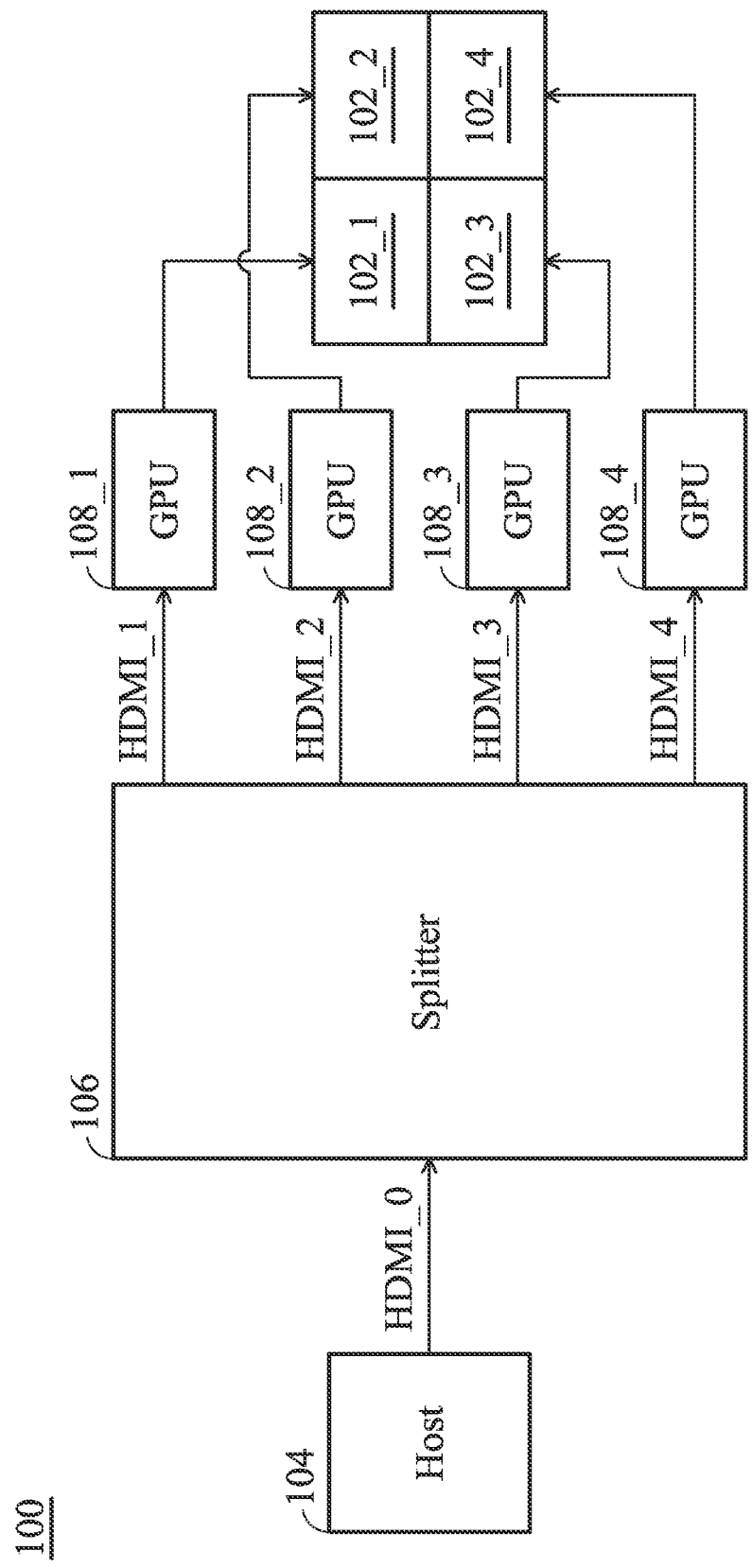
FIG. 1 is a block diagram depicting a conventional multi-screen display system 100, which uses a splitter 106 and scalers 108_1 to 108_4.
Figure 2:
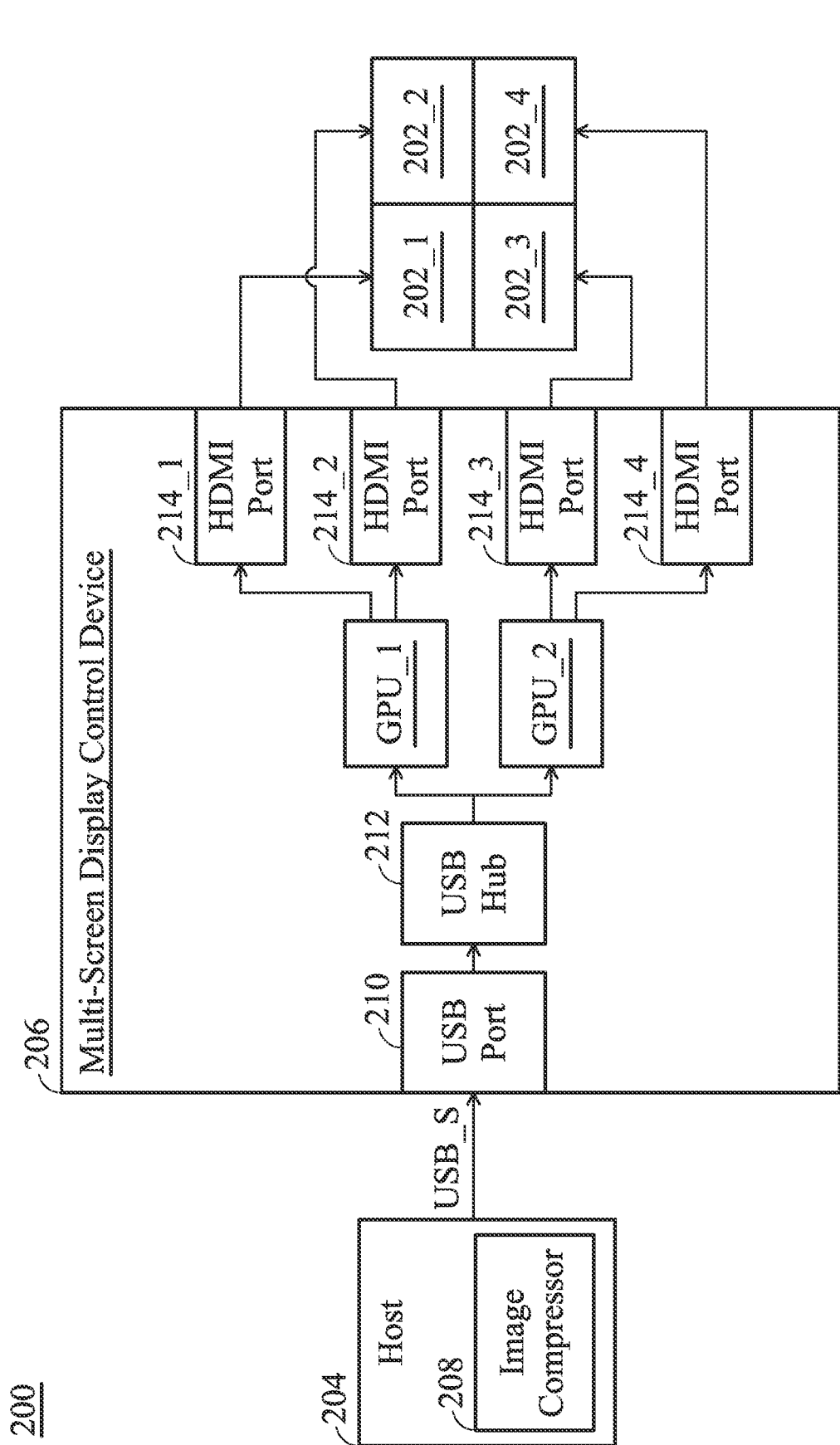
FIG. 2 illustrates a multi-screen display system 200 in accordance with an exemplary embodiment of the present invention, which communicates with the host 204 through USB and connects to the screens 202_1, 202_2, 202_3 and 202_4 through HDMI.

FIG. 2 illustrates a multi-screen display system 200 in accordance with an exemplary embodiment of the present invention. A large-screen display is formed by 2×2 screens 202_1, 202_2, 202_3, and 202_4. A host 204 communicates with a multi-screen display control device 206 via a universal serial bus interface (such as USB 3.0). The multi-screen display control device 206 communicates with the screens 202_1, 202_2, 202_3, and 202_4 through High Definition Multimedia Interface (HDMI). The multi-screen display control device 206 uses two graphics processing units GPU_1 and GPU_2. Each graphics processing unit is capable of controlling two small screens.

The host 204 can run an image compressor 208. A driver installed at the host 204 side for driving the multi-screen display control device 206 may include the function of the image compressor 208. Through the USB interface, the compressed high-definition (such as 4K) image data USB_S is transferred to the multi-screen display control device 206 (received by the USB port 210). Through the USB hub 212, the received compressed high-definition image data USB_S is coupled to the graphics processing units GPU_1 and GPU_2. The graphics processing units GPU_1 and GPU_2 have decompression functions. The graphics processing unit GPU_1 generates two HDMI sub-images (e.g., two frames of HDMI 1080p images), and transmits the two HDMI sub-images to the screens 202_1 and 202_2 through the HDMI ports 214_1 and 214_2 for image display. The graphics processing unit GPU_2 generates another two HDMI sub-images (e.g., two frames of HDMI 1080p images), and transmits the two HDMI sub-images to the screens 202_3 and 202_4 through the HDMI ports 214_3 and 214_4 for image display. A large-screen display is formed by the four frames of HDMI 1080p images respectively shown on the four screens 202_1, 202_2, 202_3, and 202_4.

Since the host 204 has the image compressor 208 and communicates with the multi-screen display control device 206 through USB, the image data USB_S can be not only 4K HD image data. The higher-quantity data (e.g., 8K or 16K HD image data) is allowed to be transferred through the USB interface. A super large screen display with HD quality is easily achieved. The host 204 may also be installed with video wall configuration software. Through the video wall configuration software, a large-screen image can be divided into 2×2 small-screen images (sub-images). In this way, the 4K high-definition image data USB_S transferred from the host 204 to the device 206 through the USB interface is stream data of 2×2 sub-images. The image data USB_S can cope with 4K HD image display. The video wall configuration software may further provide functions like boundary trimming, image (video) rotation, and so on.

Based on the proposed architecture, the image data USB_S meets the requirements of large-screen display. In another exemplary embodiment, for 8K large-screen display, the image data USB_S transferred from the host 204 to the device 206 is 8K image data. For 16K large-screen display, the image data USB_S transferred from the host 204 to the device 206 is 16K image data.

In particular, the larger the large-screen display, the more screens and the more GPUs are required. In order to be compatible with large-screen displays of various sizes, a card is proposed in accordance with an exemplary embodiment of the present invention. Each card includes a printed circuit board with multiple GPUs soldered thereon. Multiple cards can be connected in series to provide a large number of GPUs.

Figure 3:
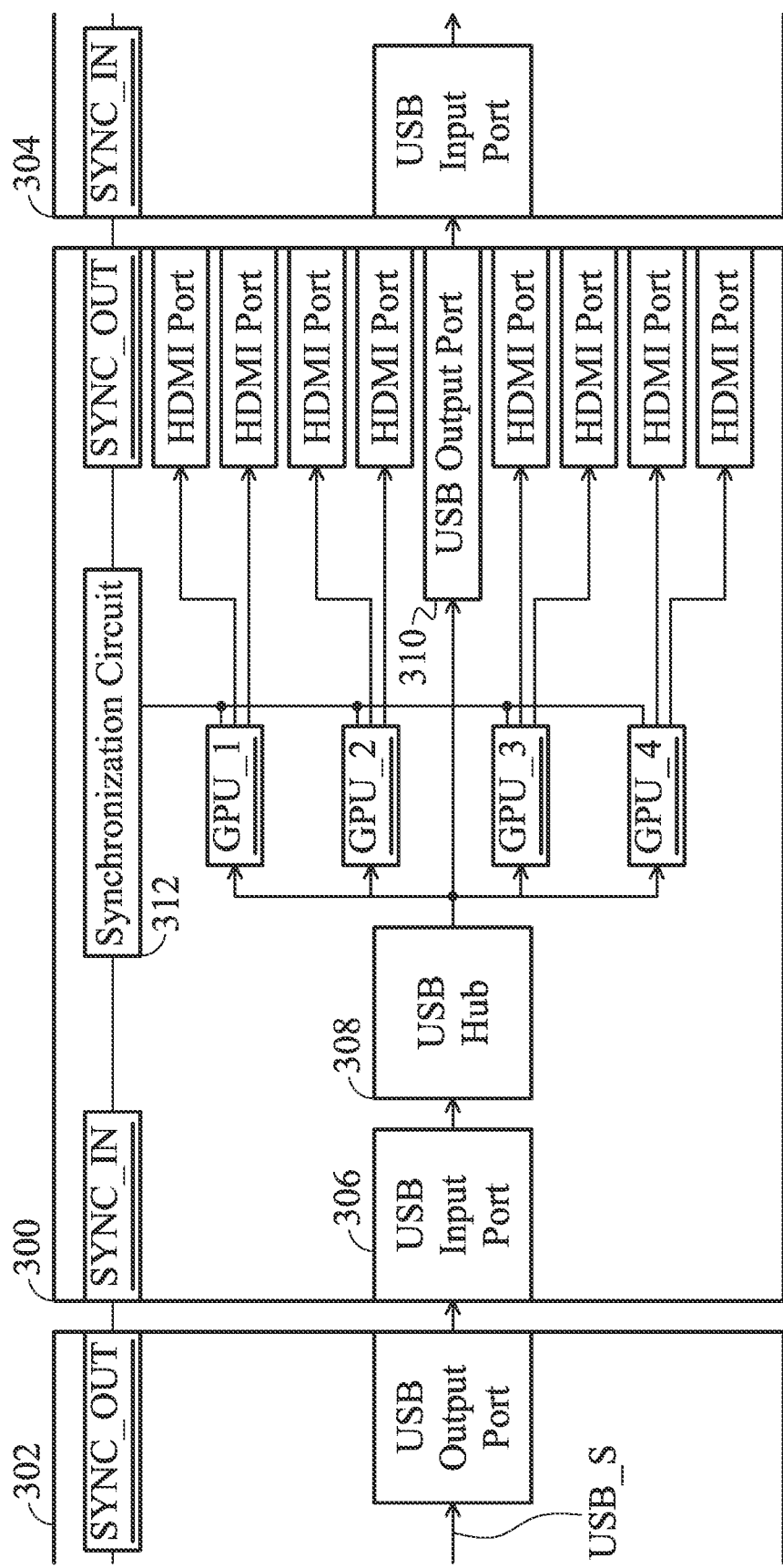
FIG. 3 illustrates a card 300 in accordance with an exemplary embodiment of the present invention, which is connected between a former-stage card 302 and a next-stage card 304.

FIG. 3 illustrates a card 300 in accordance with an exemplary embodiment of the present invention, which is connected between a former-stage card 302 and a next-stage card 304. The former-stage card 302 and the next-stage card 304 may have the similar architecture as the current-stage card 300.

The image data USB_S provided by the host 204 is transferred from the USB output port of the former-stage card 302 to the USB input port 306 of the current-stage card 300. Through the USB hub 308, the image data USB_S is further delivered to a USB output port 310 of the current-stage card 300 to be transferred to a USB input port of the next-stage card 304. The USB hub 308 also transfers the image data USB_S to the four graphics processing units GPU_1, GPU_2, GPU_3, and GPU_4 to be transformed into 8 HDMI sub-images (such as eight frames of HDMI 1080p images). The 8 HDMI sub-images are output via 8 HDMI ports to be displayed on 8 screens. In addition to the 8 HDMI sub-images generated by the current-stage card 300, the former-stage card 302 and the next-stage card 304 each also generates eight HDMI sub-images based on the image data USB_S. The multiple cards connected in series each generate a plurality of high-definition sub-images based on the same image data USB_S, and control a plurality of screens to display the high-definition sub-images. A large-screen image is displayed on the small screens.

In particular, the card 300 has a synchronization circuit 312, for synchronization among the four graphics processing units GPU_1, GPU_2, GPU_3, and GPU_4 as well as the synchronization among the cards in the different stages.

The card 300 uses a synchronization signal input terminal SYNC_IN to link a synchronization signal output terminal SYNC_OUT of the former-stage card 302, and uses a synchronization signal output terminal SYNC_OUT to link a synchronization signal input terminal SYNC_IN of the next-stage card 304. Thus, the synchronization circuits on the cards 302, 304, and 306 of the different stages are connected together to synchronize all graphics processing units (GPUs) on the different cards 302, 304, and 306.

Figure 4:
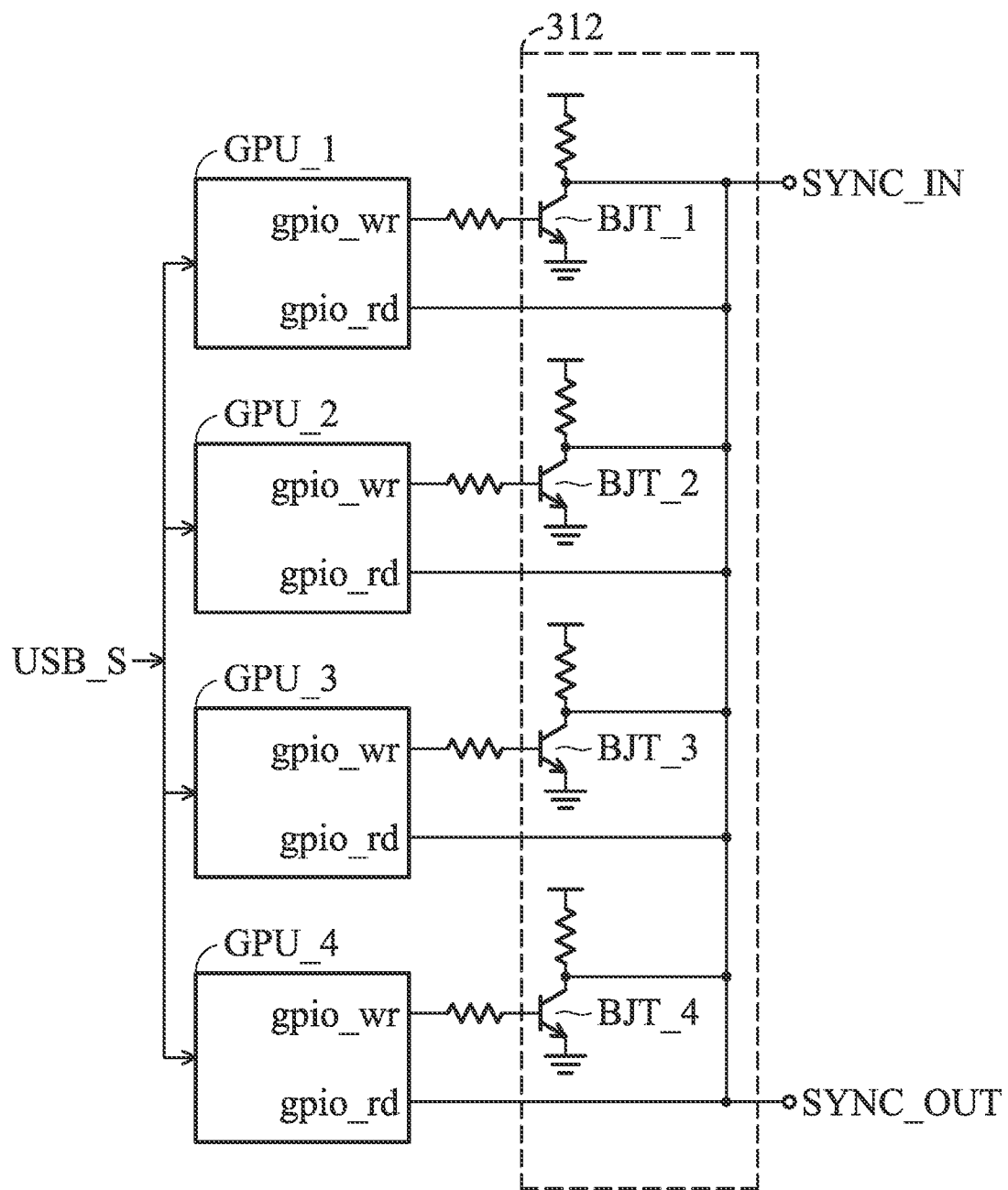
FIG. 4 illustrates the details of the synchronization circuit 312 in accordance with an exemplary embodiment of the present invention, which is a voting circuit.

FIG. 4 illustrates the details of the synchronization circuit 312 in accordance with an exemplary embodiment of the present invention. Since the different graphics processing units may receive the image data USB_S at the different time points, handshake between the graphics processing units is required to output the HDMI sub-images synchronously to make the different screens display sub-images synchronously. The synchronization circuit 312 uses a voting circuit to implement the handshake communication between the different graphics processing units.

The synchronization circuit 312 provides four bipolar transistors BJT_1, BJT_2, BJT_3, and BJT_4 corresponding to the four graphics processing units GPU_1, GPU_2, GPU_3, and GPU_4, respectively. Each graphics processing unit provides two general-purpose input and output (GPIO) pins, gpio_wr and gpio_rd, for the synchronization design. The general-purpose input and output pin gpio_wr is coupled to the base of the corresponding bipolar transistor. The general purpose input and output pin gpio_rd is coupled to the collector of the corresponding general transistor. The collectors of all bipolar transistors BJT_1, BJT_2, BJT_3, and BJT_4 are connected together.

The general purpose input and output pin gpio_wr is high by default, so that the bipolar transistors BJT_1, BJT_2, BJT_3, and BJT_4 are turned on by default and the collectors of all bipolar transistors BJT_1, BJT_2, BJT_3, and BJT_4 are low. When receiving the image data USB_S, a graphics processing unit pulls down the voltage level of the general-purpose input and output pin gpio_wr (raises the hand) to turn off the corresponding bipolar transistor. When the four graphics processing units GPU_1, GPU_2, GPU_3, and GPU_4 all receive the image data USB_S, the four bipolar transistors BJT_1, BJT_2, BJT_3, and BJT_4 are all turned off, and the collectors of all bipolar transistors BJT_1, BJT_2, BJT_3, and BJT_4 are pulled high. The general-purpose input and output pins gpio_rd of the graphics processing units GPU_1, GPU_2, GPU_3, and GPU_4, therefore, are pulled high synchronously. Accordingly, the graphics processing units GPU_1, GPU_2, GPU_3, and GPU_4 output their HDMI sub-images together to achieve the synchronous display of multiple screens.

As shown, the collectors of the four bipolar transistors BJT_1, BJT_2, BJT_3, and BJT_4 are connected to the synchronization signal input terminal SYNC_IN (connected to the former-stage card) as well as the synchronization signal output terminal SYNC_OUT (connected to the next-stage card). In this way, all GPUs on the multiple cards connected in series participate in the voting. All GPUs in the cards of the different stages are synchronized by the synchronization design.

Another important technique to synchronize the GPUs is to make their clocks the same. The different GPUs can use the same clock signal to ensure synchronization. The following paragraphs describe various techniques to provide identical clock signals.

In an exemplary embodiment, a clock signal is coupled all the way from the first-stage card to the final-stage card. In an exemplary embodiment, a clock automatic switching mechanism is provided on each card. The clock signal transferred from the former-stage card is adopted in the current-stage card by default. When the clock signal from the former-stage card is not detected, the current-stage card adopts a clock signal generated by an oscillator of the current-stage card.

In response to clock switching events, a reset design is proposed in accordance with an exemplary embodiment of the present invention, by which the GPUs in the current-stage card are reset (for example, being powered-on again, or reset by hardware). In particular, the reset of the current-stage card will trigger the reset of all cards in the later stages. For a plurality of cards connected in series, the reset signal output port of the former-stage card is connected to the reset signal input port of the current-stage card, and the reset signal output port of the current-stage card is connected to the reset signal input port of the next-stage card.

In another exemplary embodiment, a crashed GPU is automatically reset by a watchdog chip.

Figure 5A:
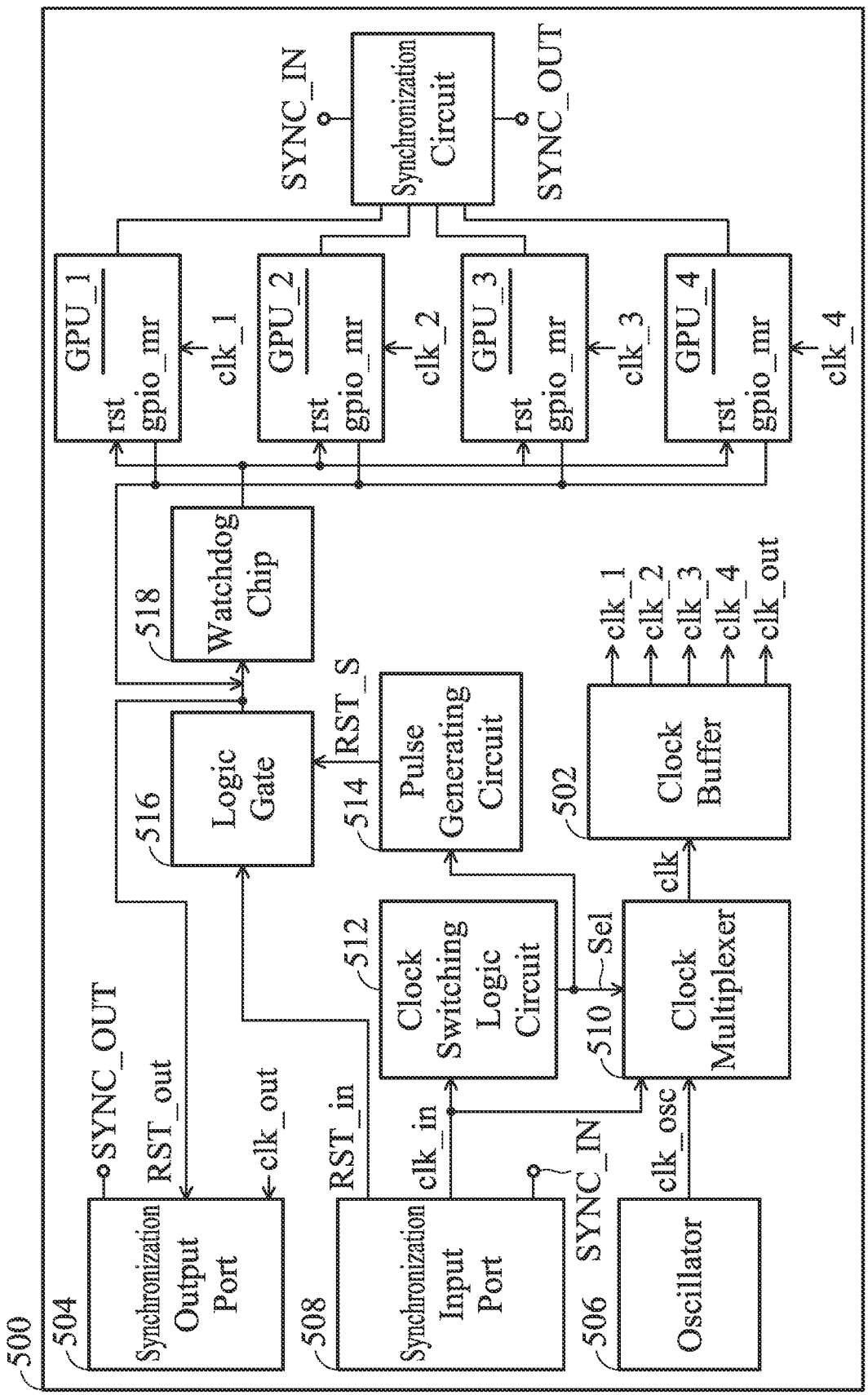
FIG. 5A illustrates a card 500 in accordance with an exemplary embodiment of the present invention, which shows the synchronization design and the crash repair design.

FIG. 5A illustrates a card 500 in accordance with an exemplary embodiment of the present invention, which shows the synchronization design and the crash repair design.

To apply the identical clock signals to the different GPUs, the card 500 includes a clock buffer 502, by which the clock signal clk is replicated as clk_1, clk_2, clk_3, and clk_4 for the four graphics processing units GPU_1, GPU_2, GPU_3 and GPU_4. The four graphics processing units GPU_1, GPU_2, GPU_3 and GPU_4, therefore, work in synchronous according to the identical clock signals clk_1, clk_2, clk_3, and clk_4.

Because the cards are connected in series, the clock signal clk is further replicated to the trace clk out through the clock buffer 502. Through a clock output terminal of a synchronization output port 504, the replicated clock signal is transferred to the next-stage card.

The clock signal clk may be an oscillation signal clk_osc generated by an oscillator 506 of the card 500, or may be a former-stage clock signal clk_in transferred from the former-stage card and received by a clock input terminal of a synchronization input port 508. As shown, the card 500 includes a clock multiplexer 510 and a clock switching logic circuit 512. The clock switching logic circuit 512 detects whether the former-stage clock signal clk_in exists. If the former-stage clock signal clk_in exists and oscillates normally, the clock switching logic circuit 512 uses a multiplexer control signal Sel to make the clock multiplexer 510 output the former-stage clock signal clk_in as the clock signal clk. If the former-stage clock signal clk_in is not detected, the clock switching logic circuit 512 uses the multiplexer control signal Sel to make the clock multiplexer 510 output the oscillation signal clk_osc as the clock signal clk.

If just one single card 500 is used, the clock signals applied to the graphics processing units GPU_1, GPU_2, GPU_3, and GPU_4 are replicated from the oscillation signal clk_osc generated by the oscillator 506. Identical clocks, therefore, are applied to all GPUs in the card 500. If multiple cards are connected in series, the oscillation signal generated by the first-stage card is transferred to the other cards stage by stage. The GPUs of all cards use the identical clock signals.

When switching the clock signal between the oscillation signal clk_osc and the former-stage clock signal clk_in, the GPUs may crash. In an exemplary embodiment, when a card is plugged into or away from the system, a clock switching event is detected by the clock switching logic circuit 512. GPUs have to be reset in response to the clock switching event. A reset circuit for resetting the GPUs may include a pulse generating circuit 514, or further include a logic gate 516, or further include a watchdog chip 518.

The clock switching logic circuit 512 is further coupled to the pulse generating circuit 514. In response to the clock switching event, the pulse generating circuit 514 generates a pulse as a reset signal RST_S. The reset signal RST_S is coupled to the reset pins rst of the graphics processing units GPU_1 . . . GPU_4. According to the reset signal RST_S, the graphics processing units GPU_1 . . . GPU_4 are powered on again (or reboot) to solve the crash problem.

When several cards are connected in series, the reset event may be triggered by a former-stage cards. A reset input signal RST_in from the former-stage card is received by a reset signal input terminal of the synchronization input port 508. The logic gate 516 combines the reset input signal RST_in transferred from the former-stage card with the reset signal RST_S generated by the pulse generating circuit 514 to control the reset pins rst of the graphics processing units GPU_1 . . . GPU_4. Accordingly, the graphics processing units GPU_1 . . . GPU_4 are powered on again to solve the crash problem. The output signal of the logic gate 516 may be further coupled to the synchronization output port 504 as a reset output signal RST_out to be transferred to the next-stage card via a rest signal output terminal of the synchronization output port 504.

Figure 5B:
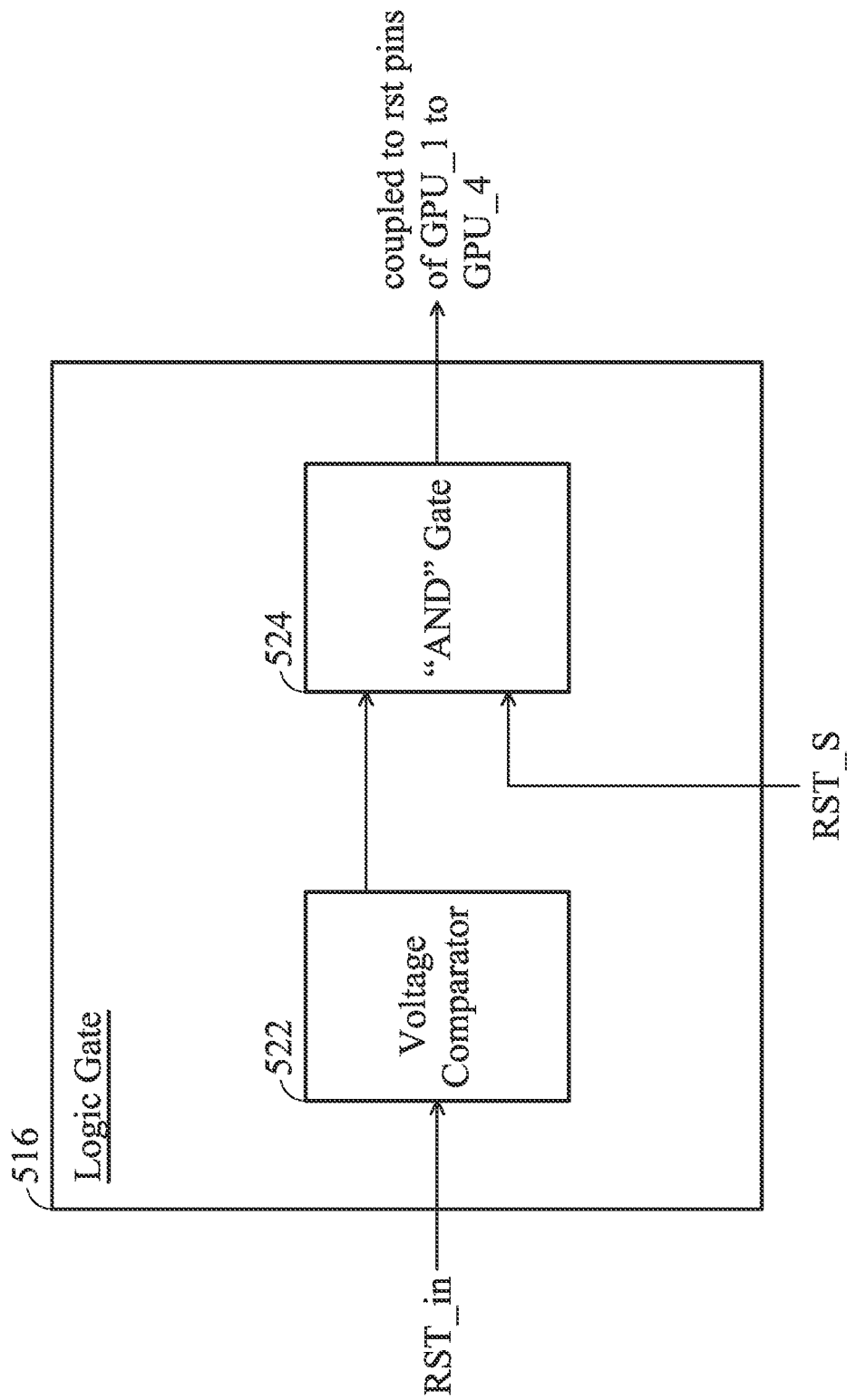
FIG. 5B illustrates the details of a logic gate 516 in accordance with an exemplary embodiment of the present invention.

FIG. 5B illustrates the details of a logic gate 516 in accordance with an exemplary embodiment of the present invention. The GPU resetting is triggered by a low-voltage signal. The logic gate 516 includes two parts, one is a voltage comparator 522 and the other is an "AND" gate 524. The voltage comparator 522 determines whether the reset input signal RST_in from the former-stage card is low. The reset signal RST_S generated by the pulse generating circuit 514 (such as an "XOR" gate) and the output of the voltage comparator 522 are sent to the AND gate 524, and the output of the AND gate 524 is used to set the reset pins rst of the graphics processing units GPU_1 . . . GPU_4. The output of the AND gate 524 is further transferred to the next-stage card as the reset output signal RST_out. In an exemplary embodiment wherein several cards are connected in series, a power failure may happen on one former-stage card while the synchronization ports between the different cards are still connected. The reset input signal RST_in from the power-failed former-stage card drops to about 1V (because the synchronization ports are still connected). If the voltage comparator 522 is removed from the card, the 1V reset input signal RST_in is directly sent to the "AND" gate 524 and the "AND" gate 524 outputs a low voltage signal. The cards in the following stages, therefore, are all reset and are paused from normally displaying images. This is why the voltage comparator 522 should not be eliminated. Because of the voltage comparator 522, the 1V reset input signal RST_in received from the power-failed former-stage card will not pull down the reset signal of the current-stage card nor the reset signals of any cards in the latter stages. The current-stage card as well as any cards in the latter stages can still normally drive the corresponding screens to display images. By the voltage comparator 522, the 1V reset input signal RST_in will not trigger the reset of the current-stage card nor any cards in the latter stages.

In FIG. 5A, a watchdog chip 518 (optional) is arranged after the logic gate 516 to deal with the crashed GPU. The watchdog chip 518 can react in response a variety of reset events. In addition to receiving the output of the logic gate 516 and reflects the aforementioned reset operations on the reset pins rst of the GPUs, the watchdog chip 518 further resets the graphics processing units GPU_1 . . . GPU_4 via the reset pins rst when any one of the graphics processing units GPU_1 . . . GPU_4 is crashed.

The watchdog chip 518 has an automatic reset design. The graphics processing units GPU_1 . . . GPU_4 each has a general-purpose input and output pin gpio_mr that is connected to the watchdog chip 518 to control an input signal of the watchdog chip 518. The host can detect abnormalities in any GPUs of any cards according to a response signal (heartbeat) from each GPU. In an exemplary embodiment, each GPU periodically outputs a response signal to the host through the USB interface. Based on the response signal, the host determines whether any GPU crashes. Once the periodic response signal disappears, the host determines that the corresponding GPU crashes. Conversely, the GPU detects a response signal (heartbeat) of the host to determine whether it communicates with the host normally. In an exemplary embodiment, when a GPU fails in decoding, fails to access an image processing memory (such as a DDR), or fails in the other operations, the GPU is incapable to receive a heartbeat packet from the host within the specified time limit. When no heartbeat packet from the host is detected, the GPU uses the general-purpose input and output pin gpio_mr to operate the watchdog chip 518 to generate a reset signal (e.g., a low-level pulse of 240 ms). The reset signal is coupled to the reset pins rst of the graphics processing units GPU_1 . . . GPU_4. In an exemplary embodiment, when the firmware program of the crashed GPU is still running, the GPU can immediately operate the watchdog chip 518 to output the rest signal and thereby all GPUs connected to the watchdog chip 518 are reset. When the firmware program also crashes, the watchdog chip 518 cannot detect any signal from the crashed GPU. Such a no signal situation can also trigger the watchdog chip 518 to reset the reset pins rst of all GPUs connected to the watchdog chip 518.

In an exemplary embodiment, each GPU has a built-in tightly coupled memory (TCM), which is a highly reliable built-in storage area storing an interrupt vector table for firmware operations. When the program malfunctions, the Advanced RISC Machine (ARM) enters an ABORT branch. The system enters a privileged mode (in the ABORT branch, due to an interrupt or interrupted data transfer) to access the TCM. According to the assembly code, the general-purpose input and output pin gpio_mr is controlled to reset the watchdog chip 518.

Figure 6A:
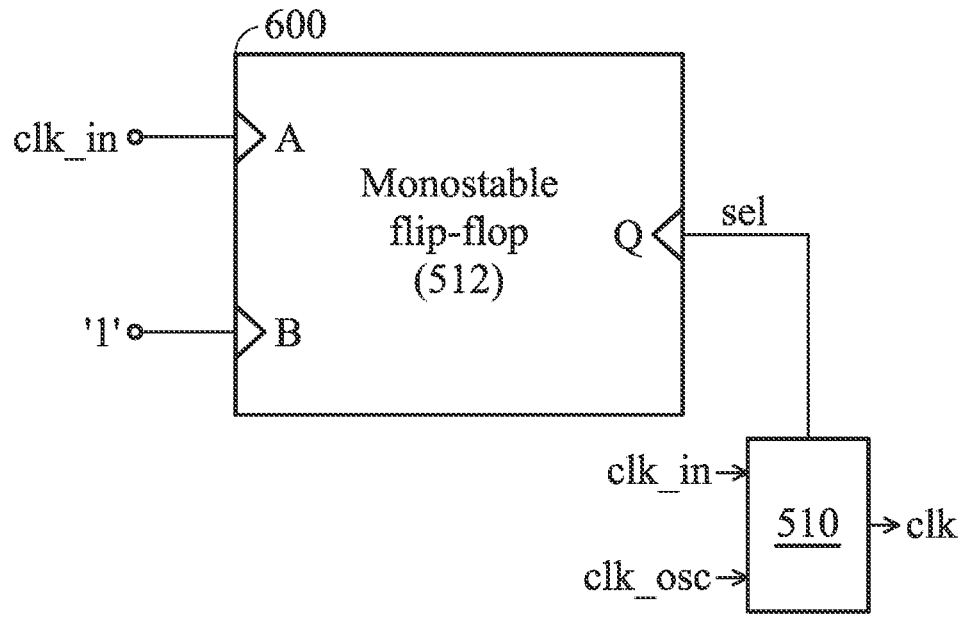
FIG. 6A depicts a monostable flip-flop 600 used as the clock switching logic circuit 512.

In an exemplary embodiment, the clock switching logic circuit 512 is a monostable flip-flop. As shown in FIG. 6A, a monostable flip-flop 600 used as the clock switching logic circuit 512 is shown, which has an input terminal A receiving the former-stage clock signal clk_in, an input terminal B fixed at a high level "1", and an output terminal Q outputting the multiplexer control signal Sel to control the clock multiplexer 510. Corresponding to each falling edge (due to the clock oscillation) of the former-stage clock signal clk_in received by the input terminal A, the output terminal Q maintains at the high level for at least a time period RT to set the clock multiplexer 510 to output the former-stage clock signal clk_in as the clock signal clk. When no oscillation is detected at the input terminal A, it means that the former-stage clock clk_in does not exist. The output terminal Q is kept at a low level to set the clock multiplexer 510 to output the oscillation signal clk_osc as the clock signal clk.

Figure 6B:
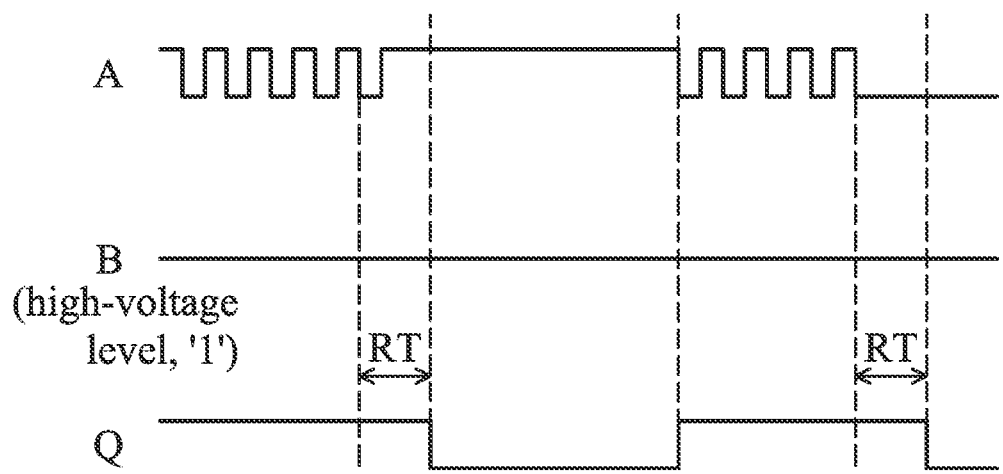
FIG. 6B illustrates the signals at the input terminals A and B and the output terminal Q of the monostable flip-flop of FIG. 6A.

FIG. 6B illustrates the signals at the input terminals A and B and the output terminal Q of the monostable flip-flop of FIG. 6A. When the former-stage clock signal clk_in detected by the input terminal A exists and works normally, the output terminal Q is at the high level. When no former-stage clock signal clk_in is detected at the input terminal A, the output terminal Q is low.

Figure 7A:
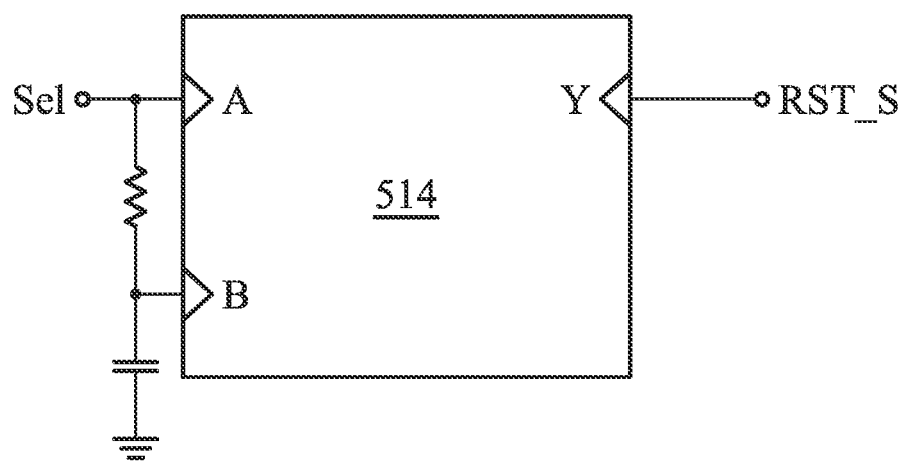
FIG. 7A illustrates the details of the pulse generating circuit 514 in accordance with an exemplary embodiment of the present invention.

FIG. 7A illustrates the details of the pulse generating circuit 514 in accordance with an exemplary embodiment of the present invention, which includes a logic circuit that includes input terminal A and B and an output terminal Y. The level changes of the input terminals A and B are reflected on the output terminal Y. The input terminal A receives the multiplexer control signal Sel generated by the clock switching logic circuit 512. The multiplexer control signal Sel is further input to the input terminal B after an RC delay. The output terminal Y provides the reset signal RST_S.

Figure 7B:
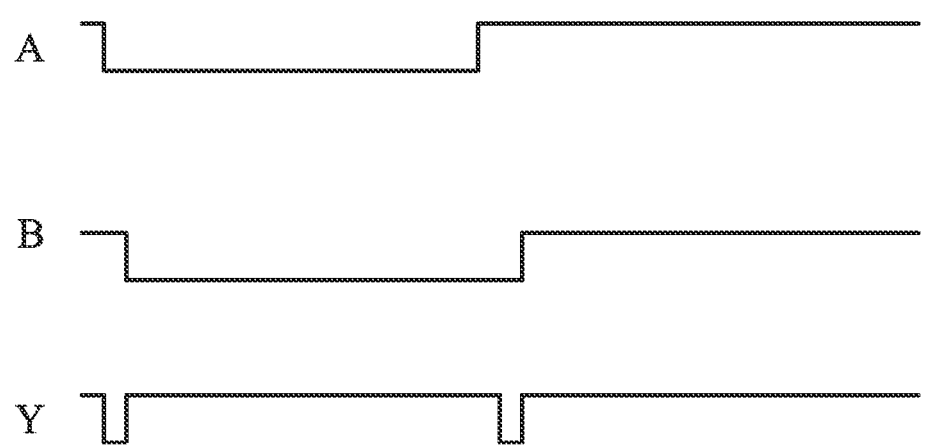
FIG. 7B illustrates the signals at the input terminals A and B and the output terminal Y of the pulse generating circuit 514 of FIG. 7A.

FIG. 7B illustrates the signals at the input terminals A and B and the output terminal Y of the pulse generating circuit 514 of FIG. 7A. Corresponding to the level changes of the input A and B signals, a low-level pulse is output from the output terminal Y signal as the reset signal RST_S.

Figure 8:
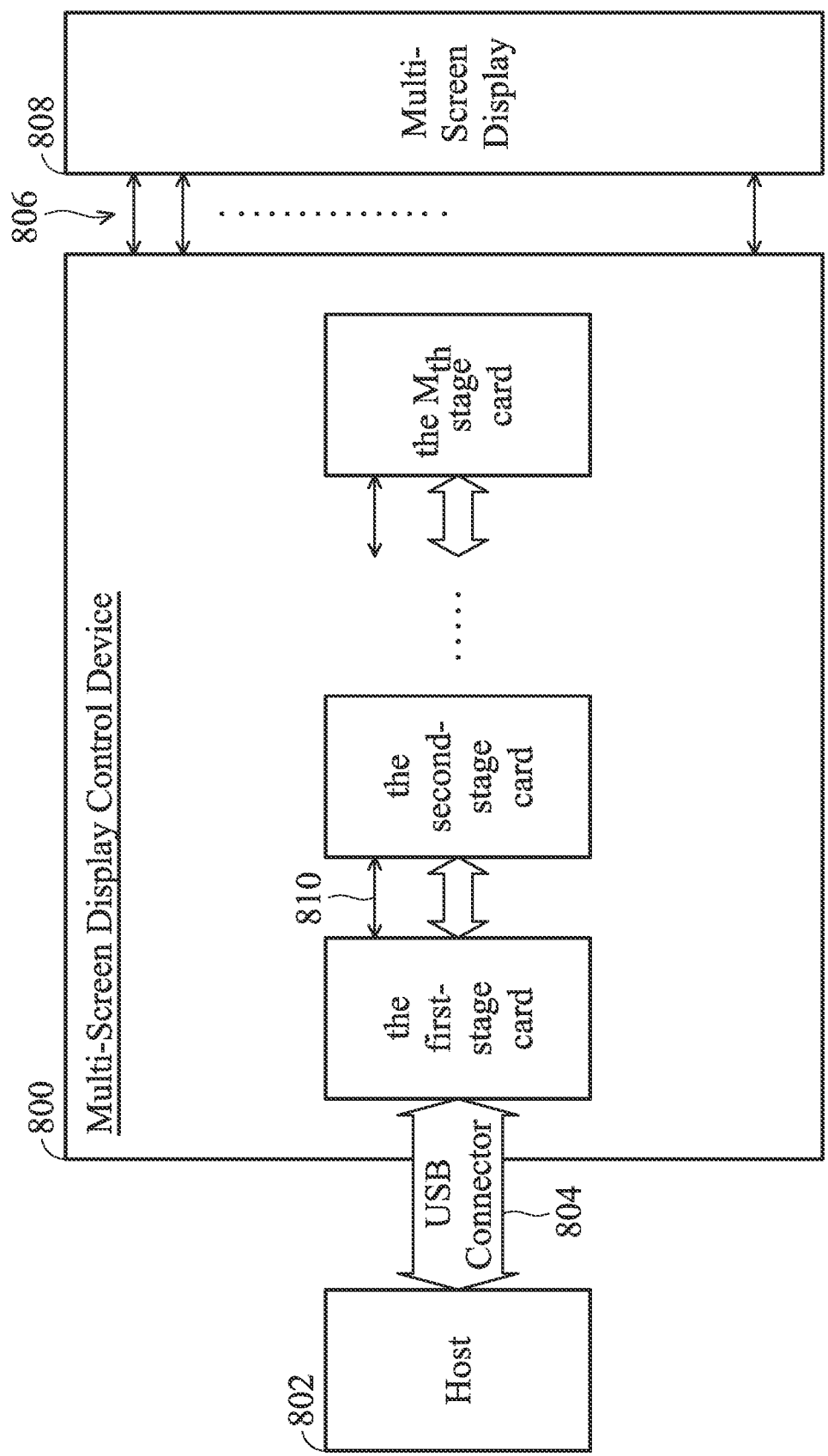
FIG. 8 illustrates a multi-screen display control device 800 in accordance with an exemplary embodiment of the present invention.

FIG. 8 illustrates a multi-screen display control device 800 in accordance with an exemplary embodiment of the present invention. A host 802 is connected to the multi-screen display control device 800 through a USB connector 804. The multi-screen display control device 800 uses HDMI connectors 806 to link to multiple screens that form a multi-screen display 808. The multi-screen display control device 800 includes M cards connected in series, and the M cards can be packaged in one casing. The M cards are connected in series via USB ports as well as synchronization ports 810 (for synchronization among the different cards). Each card has at least one graphics processing unit. The graphics processing units of the different cards control multiple screens to display a large-screen image. The users can set how to drive the cards through a graphics-user interface (GUI) on the host 802.

In an exemplary embodiment, an operating system (such as WINDOWS 10) fetches a 4K or 8K image (which is regarded as a "large-screen image") and transfers the data of the large-screen image to the multi-screen display control device 800 via the USB connector 804 to drive the multi-screen display 808. The multi-screen display 808 is virtualized as a complete large (e.g., 4K or 8K) screen. The operating system is driving a virtualized complete big (e.g., 4K or 8K) screen rather than driving separated small screens. The graphics card driver is similar to a general graphics card driver. Through the graphics card driver, a large-screen image is displayed on the virtualized complete big screen, and can be processed as a general image. For example, replication of the complete large-screen image (to drive several sets of multi-screen displays to display the same images) or image expansion of the complete large-screen image (to drive several sets of multi-screen displays to display the expanded super-large screen image) is allowed.

To build a video wall, video wall configuration software may be installed at the host 802 side. The video wall configuration software can divide a large-screen image into A×B small screen images and then output them to the multi-screen display control device 800 via the USB connector 804. This video wall configuration software may further include functions such as boundary elimination and image rotation.

It is allowed to connect the USB ports between the host 802 and the multi-screen display control device 800 after powering on the multi-screen display control device 800. The multi-screen display control device 800 is a hot plug-in and plug-out device.

The synchronous ports may also support the hot plugging. When establishing connection between the synchronous ports of the different cards (e.g. connecting a synchronous output port of a former-stage card to a synchronous input port of the current-stage card), clock switching for identical clocks on the different cards happens, so that the all M stages of cards are reset together for normal operations.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-screen display control device, comprising:
   a plurality of graphics processing units, transforming image data that a host transfers to the multi-screen display control device through a universal serial bus interface into a plurality of high-definition multi-media interface sub-images to be displayed by a plurality of screens; and
   a watchdog chip, coupled to the graphics processing units, wherein the watchdog chip outputs a reset signal to reset all of the graphics processing units when any of the graphics processing units crashes.

2. The multi-screen display control device as claimed in claim 1, wherein:
   each graphics processing unit has a general-purpose input and output pin coupled to the watchdog chip to operate the watchdog chip to output the reset signal via an output terminal of the watchdog chip.

3. The multi-screen display control device as claimed in claim 2, wherein:
the output terminal of the watchdog chip is coupled to a reset pin of each graphics processing unit.

4. The multi-screen display control device as claimed in claim 3, wherein:
when failing to receive a heartbeat packet from the host within a specified time limit, a graphics processing unit uses the general-purpose input and output pin to operate the watchdog chip to output the reset signal.

5. The multi-screen display control device as claimed in claim 4, wherein:
when a graphics processing unit fails in decoding or fails to access a storage device of the graphics processing unit, the graphics processing unit fails to receive the heartbeat packet from the host within the specified time limit.

6. The multi-screen display control device as claimed in claim 4, wherein:
the watchdog chip is triggered by a low-voltage signal to output the reset signal.

7. The multi-screen display control device as claimed in claim 6, wherein:
when a general-purpose input and output pin of a firmware failed graphics processing unit is low, the firmware failed graphics processing unit triggers the watchdog chip to output the reset signal.

8. The multi-screen display control device as claimed in claim 6, wherein:
each graphics processing unit has a tightly-coupled memory, which stores an interrupt vector table for firmware operations; and
a firmware failed graphics processing unit accesses the tightly-coupled memory to pull down a voltage level at the general-purpose input and output pin to trigger the watchdog chip to output the reset signal.

9. The multi-screen display control device as claimed in claim 3, wherein:
the watchdog chip further outputs the reset signal based on clock switching of the graphics processing units.

10. The multi-screen display control device as claimed in claim 9, wherein:
the watchdog chip is triggered by a low-voltage signal at an input terminal of the watchdog chip; and
the general-purpose input and output pin of each graphics processing unit is coupled the input terminal of the watchdog chip.

11. The multi-screen display control device as claimed in claim 10, wherein:
a logic gate is coupled to the watchdog chip; and
in response to clock switching of the graphics processing units, the logic gate provides the low-voltage signal at the input terminal of the watchdog chip.

12. A multi-screen display control device, comprising:
a plurality of card; and
a plurality of universal serial bus cables connecting the cards in series, wherein image data provide by a host and input the multi-screen display control device via a universal serial bus port is transferred through the universal serial bus cables,
wherein each card includes a plurality of graphics processing units and a watchdog chip and, in each card:
the image data is transformed into a plurality of high-definition multi-media interface sub-images by the graphics processing units, to be displayed on a plurality of screens; and
the watchdog chip outputs a reset signal to reset all of the graphics processing units of the card when any of the graphics processing units of the card crashes.

13. The multi-screen display control device as claimed in claim 12, wherein in each card:
each graphics processing unit has a general-purpose input and output pin coupled to the watchdog chip to operate the watchdog chip to output the reset signal via an output terminal of the watchdog chip.

14. The multi-screen display control device as claimed in claim 13, wherein in each card:
the output terminal of the watchdog chip is coupled to a reset pin of each graphics processing unit.

15. The multi-screen display control device as claimed in claim 14, wherein:
when failing to receive a heartbeat packet from the host within a specified time limit, a graphics processing unit uses the general-purpose input and output pin to operate the corresponding watchdog chip to output the reset signal.

16. The multi-screen display control device as claimed in claim 15, wherein:
when a graphics processing unit fails in decoding or fails to access a storage device of the graphics processing unit, the graphics processing unit fails to receive the heartbeat packet from the host within the specified time limit.

17. The multi-screen display control device as claimed in claim 15, wherein:
each watchdog chip is triggered by a low-voltage signal to output the reset signal.

18. The multi-screen display control device as claimed in claim 17, wherein:
when a general-purpose input and output pin of a firmware failed graphics processing unit is low, the firmware failed graphics processing unit triggers the corresponding watchdog chip to output the reset signal.

19. The multi-screen display control device as claimed in claim 18, wherein:
each graphics processing unit has a tightly-coupled memory, which stores an interrupt vector table for firmware operations; and
a firmware failed graphics processing unit accesses the tightly-coupled memory to pull down a voltage level at the general-purpose input and output pin to trigger the corresponding watchdog chip to output the reset signal.

20. The multi-screen display control device as claimed in claim 14, wherein:
each watchdog chip further outputs the reset signal based on clock switching of the corresponding graphics processing units.

21. The multi-screen display control device as claimed in claim 20, wherein:
each watchdog chip further outputs the reset signal in response to a reset request received from a former-stage card.

22. The multi-screen display control device as claimed in claim 21, wherein in each card:
the watchdog chip is triggered by a low-voltage signal at an input terminal of the watchdog chip; and
the general-purpose input and output pin of each graphics processing unit in the card is coupled the input terminal of the watchdog chip.

23. The multi-screen display control device as claimed in claim 22, wherein each card further comprises:
- a logic gate, coupled to the watchdog chip,
- wherein the logic gate generates the low-voltage signal for the watchdog chip in response to clock switching of the graphics processing units in the card or in response to the reset request received from the former-stage card.

24. The multi-screen display control device as claimed in claim 23, wherein in each card:
- an output terminal of the logic gate is further coupled to a next-stage card to reset graphics processing units of a next-stage card.

* * * * *